(12) United States Patent
Liang et al.

(10) Patent No.: US 11,226,864 B2
(45) Date of Patent: Jan. 18, 2022

(54) METHOD OF COLLECTING ERROR LOGS

(71) Applicant: Jabil Circuit (Shanghai) Co., Ltd., Shanghai (CN)

(72) Inventors: Chin Liang, New Taipei (TW); Yen-Cheng Chang, New Taipei (TW); Shuo-Hung Hsu, New Taipei (TW)

(73) Assignee: Jabil Circuit (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 17/230,110

(22) Filed: Apr. 14, 2021

(65) Prior Publication Data
US 2021/0326208 A1 Oct. 21, 2021

(30) Foreign Application Priority Data

Apr. 17, 2020 (CN) .......................... 202010304636.0

(51) Int. Cl.
*G06F 11/14* (2006.01)
*G06F 11/07* (2006.01)

(52) U.S. Cl.
CPC ...... *G06F 11/1417* (2013.01); *G06F 11/0706* (2013.01); *G06F 11/0769* (2013.01); *G06F 11/0772* (2013.01); *G06F 11/0775* (2013.01); *G06F 11/0778* (2013.01); *G06F 11/0787* (2013.01); *G06F 2201/805* (2013.01)

(58) Field of Classification Search
CPC ............. G06F 11/0766; G06F 11/0769; G06F 11/0775; G06F 11/0778; G06F 11/0787; G06F 11/1415; G06F 11/1417; G06F 11/2284; G06F 11/079
See application file for complete search history.

(56) References Cited

U.S. PATENT DOCUMENTS

| 2011/0154091 A1* | 6/2011 | Walton ................ G06F 11/0766 714/2 |
| 2016/0261455 A1* | 9/2016 | Su ........................ H04L 41/0686 |
| 2018/0307545 A1* | 10/2018 | Ganesan ............. G06F 11/3072 |
| 2019/0332453 A1* | 10/2019 | Song ................... G06F 11/0772 |

(Continued)

OTHER PUBLICATIONS

"Intelligent Platform Management Interface Specification Second Generation", Oct. 1, 2013, Intel, Hewlett-Packard, NEC, Dell, Retrieved from Google: <https://www.intel.com/content/dam/www/public/us/en/documents/product-briefs/ipmi-second-gen-interface-spec-v2-rev1-1.pdf> (Year: 2013).*

(Continued)

*Primary Examiner* — Bryce P Bonzo
*Assistant Examiner* — Albert Li
(74) *Attorney, Agent, or Firm* — Young Basile Hanlon & MacFarlane, P.C.

(57) ABSTRACT

A method of collecting error logs according to the disclosure includes generating, during procedure of BIOS of a server, at least one BIOS error log based on detection of an error condition of one or more of hardware devices and a CPU, transmitting the at least one BIOS error log to a BMC, storing the at least one BIOS error log received from the CPU, packaging the at least one BIOS error log and at least one log that is generated by the BMC and that is related to BMC sensors to generate an error log file, and storing the error log file.

5 Claims, 6 Drawing Sheets

(56) References Cited

U.S. PATENT DOCUMENTS

2020/0159646 A1\* 5/2020 Fujii .................. G06F 11/28
2021/0026737 A1\* 1/2021 McAdams .......... G06F 11/1417

OTHER PUBLICATIONS

"Windows Logging Basics", Nov. 29, 2019, Solarwinds, Retrieved from The Wayback Machine: <https://web.archive.org/web/20191129131548/https://www.loggly.com/ultimate-guide/windows-logging-basics/> (Year: 2019).\*

\* cited by examiner

700

| Error type | Error condition |
|---|---|
| Computer memory | An uncorrectable memory error was detected in DIMM slot 1 |

FIG. 5

METHOD OF COLLECTING ERROR LOGS

CROSS-REFERENCE TO RELATED APPLICATION

This application claims priority to Chinese Invention Patent Application No. 202010304636.0, filed on Apr. 17, 2020.

TECHNICAL FIELD

The disclosure relates to a method of collecting error logs, and more particularly to a method of collecting error logs in a server.

BACKGROUND

A baseboard management controller (BMC) is usually adopted in a server for managing operation and monitoring health of the server. The types and detail levels of errors detectable by the BMC are limited, and several system errors related to hardware, such as errors related to a central processing unit (CPU) and a hard disk drive, are not detectable by the BMC.

In a booting process of a server, a power-on self-test (POST) is performed by Basic Input/Output System (BIOS) of the server for hardware initialization. When an error or abnormality occurs, the procedure of hardware initialization stops at a stage (also known as a checkpoint) that corresponds to the error or abnormality, and the POST generates a BIOS POST code that represents the stage where the error or abnormality occurred.

Conventionally, when a hardware error occurs, a BMC or BIOS may generate a system event log (SEL). Even if the SEL may be timely sent to a terminal for error detection, since the SEL usually does not contain sufficient details, it is difficult to find the cause of the hardware error.

In another scenario, when an error or abnormality occurs in a server, specific error detection firmware for the BIOS and BMC may be used to generate error detection logs. However, an administrator has to be on site to connect the server to an external hardware device that has the specific error detection firmware stored therein so as to load the specific firmware to the server for obtaining the error detection logs. The whole process is time consuming and inconvenient for the administrator. Moreover, the error detection logs generated by the specific firmware may not completely reflect the condition under which the error or abnormality occurred, making subsequent analysis and repair difficult.

SUMMARY

Therefore, an object of the disclosure is to provide a method of collecting error logs that can alleviate at least one of the drawbacks of the prior art.

In one aspect of this disclosure, the method is to be implemented by a server that includes a central processing unit (CPU), a plurality of hardware devices, a baseboard management controller (BMC), and a plurality of BMC sensors. The method includes: by the CPU when it is determined, during procedure of Basic Input/Output System (BIOS) of the server, that at least one error occurred in one or more of the hardware device and the CPU, generating at least one BIOS error log based on detection of an error condition of said one or more of the hardware devices and the CPU, where the at least one BIOS error log has a structured format and corresponds to the one or more of the hardware devices and the CPU; by the CPU, transmitting the at least one BIOS error log to the BMC; by the BMC, storing the at least one BIOS error log received from the CPU; and by the BMC, packaging the at least one BIOS error log and at least one log that is generated by the BMC and that is related to the BMC sensors to generate an error log file, and storing the error log file.

In another aspect of this disclosure, the method is to be implemented by a server that includes BIOS, a plurality of hardware devices, a BMC and a plurality of BMC sensors. The method includes: by the BIOS, generating at least one BIOS error log based on detection of an error condition of one or more of the hardware devices having at least one error, and transmitting the at least one BIOS error log to the BMC, where the at least one BIOS error log corresponds to the one or more of the hardware devices having the at least one error; by the BMC, generating at least one BMC error log that corresponds to one or more of the BMC sensors to which a system error is related; and by the BMC, packaging the at least one BIOS error log and the at least one BMC error log to generate an error log file, and storing the error log file.

In further another aspect of this disclosure, the method is to be implemented by a server that includes BIOS, a plurality of hardware devices, a BMC and a plurality of BMC sensors. The method includes: by the BIOS, generating at least one BIOS error log based on detection of an error condition of one or more of the hardware devices having at least one error occurred therein, and transmitting the at least one BIOS error log to the BMC, where the at least one BIOS error log corresponds to the one or more of the hardware devices having the at least one error occurred therein; by the BIOS, generating at least one BIOS normal log based on detection of normal operation of one or more of the hardware devices, and transmitting the at least one BIOS normal log to the BMC, where the at least one BIOS normal log corresponds to the one or more of the hardware devices in normal operation; by the BMC, generating at least one BMC error log that corresponds to one or more of the BMC sensors to which a system error is related; and by the BMC, packaging the at least one BIOS error log, the at least one BIO normal log and the at least one BMC error log to generate an error log file, and storing the error log file.

BRIEF DESCRIPTION OF THE DRAWINGS

Other features and advantages of the disclosure will become apparent in the following detailed description of the embodiment(s) with reference to the accompanying drawings, of which:

FIG. 5 illustrates an exemplary embodiment of a parsed result according to the disclosure.

DETAILED DESCRIPTION

Figure 1:
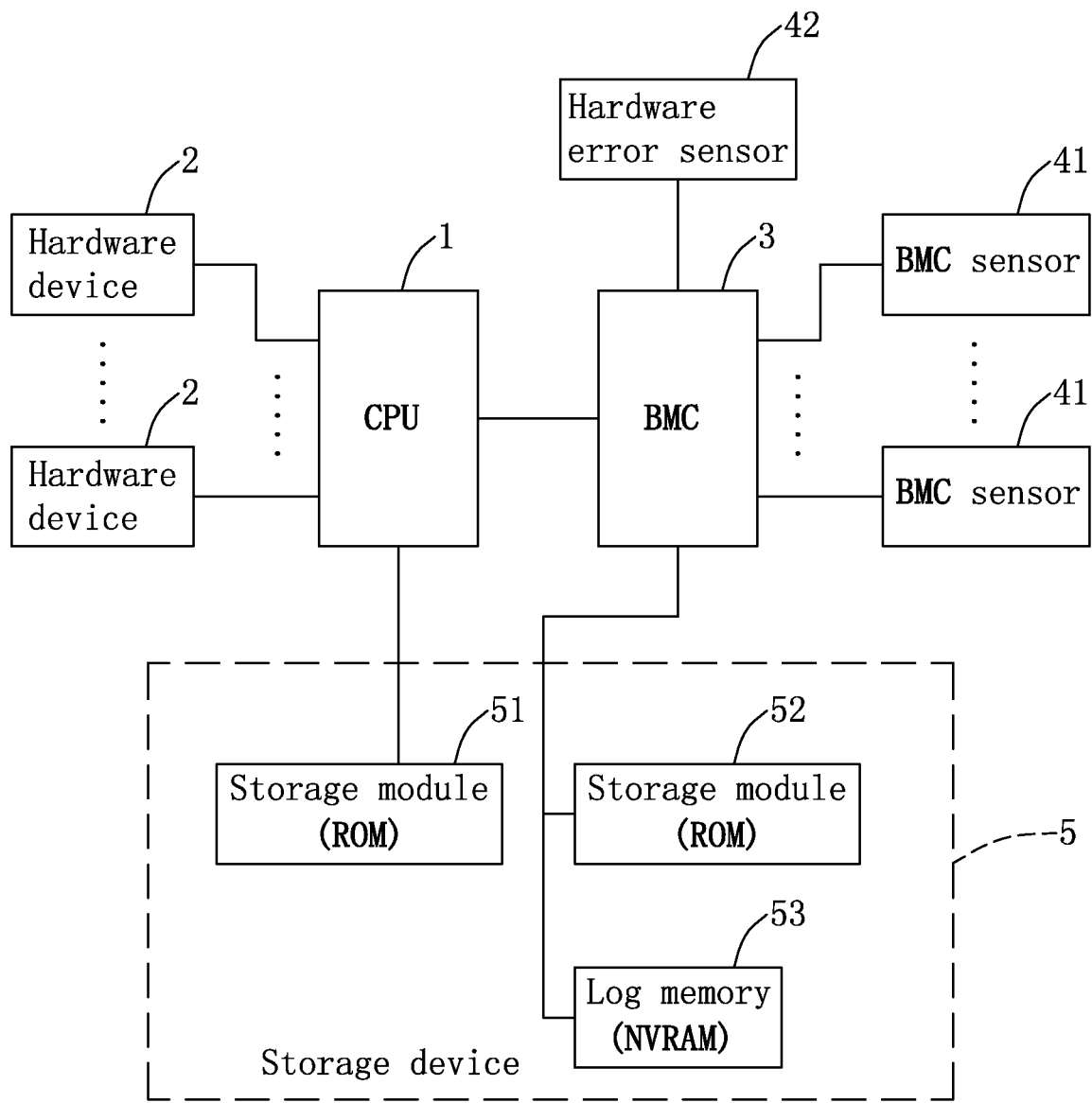
FIG. 1 is a block diagram illustrating an embodiment of a server adapted to implement a method of collecting error logs according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of a server system 100 that is configured to implement a method of collecting error logs according to the disclosure is illustrated. The server system 100 includes a central processing unit (CPU) 1, a plurality of hardware devices 2 electrically connected to the CPU 1, a baseboard management controller (BMC) 3 electrically connected to the CPU 1, a plurality of BMC sensors 41 electrically connected to the BMC 3, a hardware error sensor 42 electrically connected to the BMC 3, and a storage device 5 electrically connected to the CPU 1 and the BMC 3. The CPU 1 includes a Platform Controller Hub (PCH) integrated therein, but in other embodiments, the CPU 1 may be separated from the PCH and may be connected with the PCH via a Direct Media Interface (DMI). The plurality of hardware devices 2 are implemented to be, but are not limited to, computer memory, a Serial Attached SCSI (SAS) hard disk, a Serial ATA (SATA) hard disk, and Peripheral Component Interconnect Express (PCIe) compatible components, such as a graphics card, a solid-state drive that supports non-volatile memory express (NVMe) and a network adaptor. The plurality of BMC sensors 41 are implemented to be, but are not limited to, fan sensors configured to sense rotation speeds of fans, voltage sensors configured to measure voltages in a system, and a temperature sensor configured to measure a temperature of the CPU 1. The hardware error sensor 42 is implemented to be, but is not limited to, a programmable logic device, such as a complex programmable logic device (CPLD), and is adapted to sense errors in one or more of the hardware devices 2. In one embodiments, the hardware error sensor 42 senses errors according to signals from error pins of the CPU 1 and/or signals from the BMC sensors 41 by using polling technique or in response to trigger of event.

The storage device 5 includes two storage modules 51, 52 and a log memory 53. One of the two storage modules 51 is electrically connected to the CPU 1, is implemented to be a read-only memory (ROM), and stores firmware for Basic Input/Output System (BIOS) of the server 100. The other of the two storage modules 52 is electrically connected to the BMC 3, is also implemented to be a ROM, and stores firmware for the BMC 3. The log memory 53 is electrically connected to the BMC 3, is implemented to be a non-volatile random-access memory (NVRAM), and is utilized to store log data and files related to the CPU 1 and the BMC 3. For example, the log memory 53 is configured to store a plurality of BIOS normal logs which are generated by the CPU 1 and which are related to normal operation of the hardware devices 2 and the CPU 1, at least one BIOS error log which is generated by the CPU 1 and which is related to an error condition of one or more of the hardware devices 2 and the CPU 1, a plurality of BMC normal logs which are generated by the BMC 3 and which are related to normal operation of the BMC sensors 41, at least one BMC error log which is generated by the BMC 3 and which is related to an error condition of one or more of the BMC sensors 41, and an error log file that contains the aforementioned BIOS and BMC normal logs and BIOS and BMC error logs.

In one embodiment, the method of collecting error logs according to the disclosure is to be implemented by the server 100 in a booting process or in an operating state. In one embodiment, the server 100 is in the operating state after the booting process is completed successfully.

Figure 2:
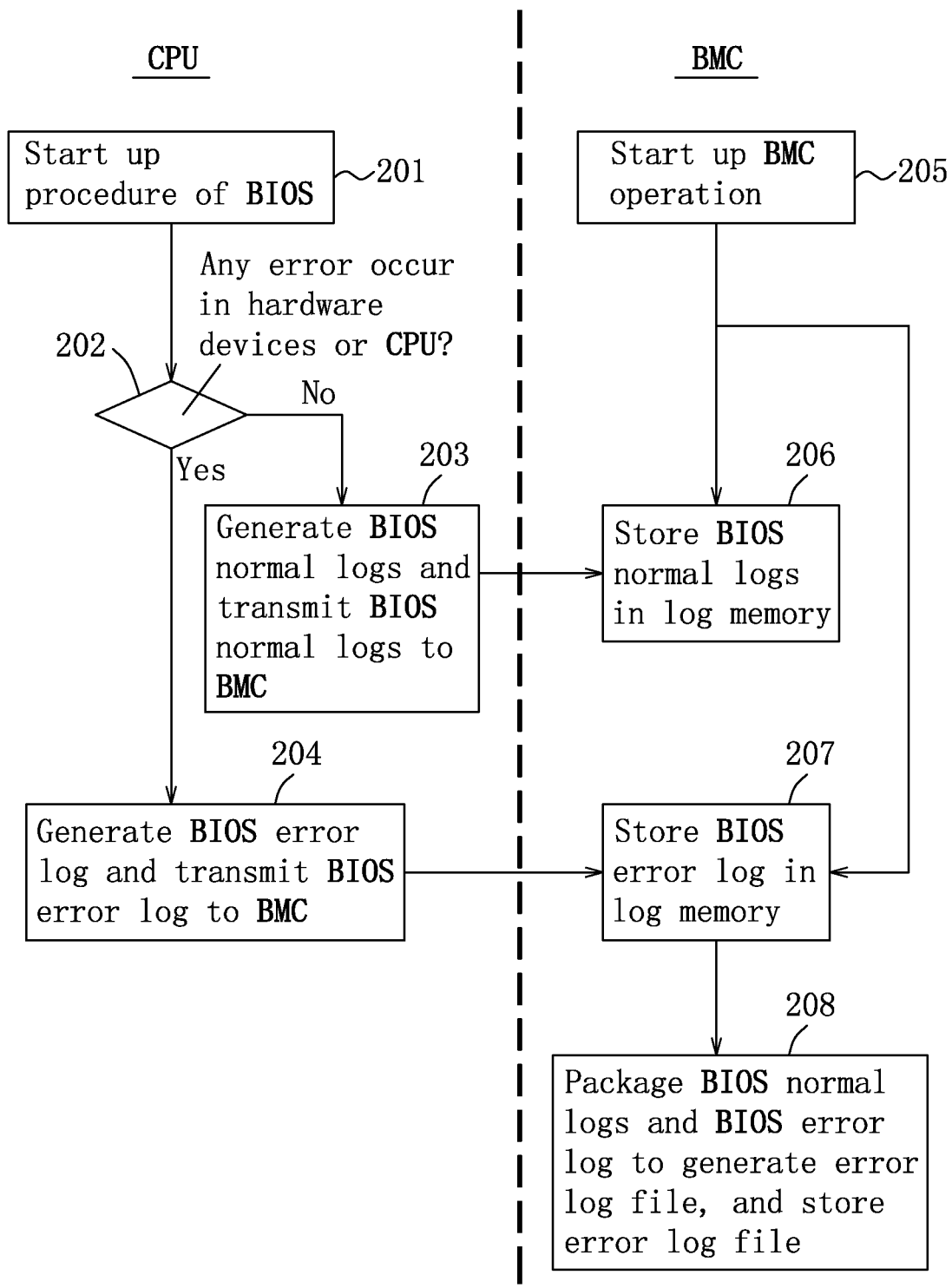
FIG. 2 is a flow chart illustrating an embodiment of the method of collecting error logs according to the disclosure to be implemented by the server in a booting process.

Referring to FIGS. 1 and 2, an embodiment of the method of collecting error logs to be implemented by the server 100 in the booting process is illustrated. The method of collecting error logs includes steps 201 to 208.

In step 201, the CPU 1 starts up procedure of the BIOS.

In step 202, the CPU 1, by executing the firmware for the BIOS which is stored in the storage module 51, determines whether there is any error in one of the hardware devices 2 and the CPU 1. When it is determined that there is no error in any of the hardware devices and the CPU 1, that is to say, the procedure of the BIOS has completed successfully, a flow of the method of collecting error logs proceeds to step 203. When it is determined that at least one error occurred in one or more of the hardware devices 2 and the CPU 1, the flow of the method proceeds to step 204.

In step 203, the CPU 1, by executing the firmware for the BIOS, generates the plurality of BIOS normal logs based on detection of the normal operation of the hardware devices 2 and the CPU 1 (i.e., no error occurred), and transmits the plurality of BIOS normal logs to the BMC 3. The plurality of BIOS normal logs have a structured format and correspond respectively to the hardware devices 2 and the CPU 1. The flow of the method proceeds to step 206.

In step 204, the CPU 1, by executing the firmware for the BIOS, generates the at least one BIOS error log based on detection of an error condition of said one or more of the hardware devices 2 and the CPU 1 having the at least one error, and transmits the at least one BIOS error log to the BMC 3. The at least one BIOS error log has a structured format and corresponds to said one or more of the hardware devices 2 and the CPU 1 having the at least one error. For example, when it is determined by the CPU 1 in step 202 that an error occurred solely in the CPU 1, the CPU 1 in step 203 generates a CPU error log based on detection of the error condition of the CPU 1. In this scenario, the CPU error log may be deemed as the BIOS error log. In another example, when it is determined by the CPU 1 in step 202 that there are errors not only in the CPU 1 but also in one of the hardware devices 2 (e.g., the computer memory), the CPU 1 in step 203 not only generates a CPU error log corresponding to the CPU 1 based on detection of the error condition of the CPU 1 but also generates a memory error log corresponding to the computer memory based on detection of the error condition of the computer memory. In this scenario, the CPU error log and the memory error log may both be deemed as the BIOS error logs. In one embodiment, the structured format of the plurality of BIOS normal logs may be identical to that of the at least one BIOS error log.

In one embodiment, the CPU 1, by executing specific instructions contained in the firmware for the BIOS, generates the plurality of BIOS normal logs or the at least one BIOS error log, depending on the situation, in the structured format. Specifically, the structured format is implemented to be, but is not limited to, one of the comma-separated values (CSV) file format, the JavaScript Object Notation (JSON) file format, and the Extensible Markup Language (XML) file format. Moreover, the at least one BIOS error log indicates the structured format of the at least one BIOS error log, a type of error, and information related to the error condition. For example, a BIOS error log may be recorded as "[JBL_CSV]{Keyword: SMBIOSInfo}{Type:Type0}{Index:0}{Offset:00h}{Name:Type}{Value:0x0}{Description:BIOS Information}".

In step 205, the BMC 3 starts up its operation by executing the firmware for the BMC 3 which is stored in the storage module 52.

In step 206 following step 203 and step 205, the BMC 3, by executing the firmware for the BMC 3, stores the plurality of BIOS normal logs received from the CPU 1 in the log memory 53. It is noted that when there is insufficient storage space left in the log memory 53 for storing the plurality of BIOS normal logs, the BMC 3 is configured to overwrite existing logs (e.g., the BIOS normal logs stored the earliest) with the plurality of BIOS normal logs received from the CPU 1 in step 203.

In step 207 following steps 204 and 205, the BMC 3, by executing the firmware for the BMC 3, stores the at least one BIOS error log received from the CPU 1 in the log memory 53.

In step 208, the BMC 3, by executing packaging instructions contained in the firmware for the BMC 3, packages the plurality of BIOS normal logs (e.g., the plurality of BIOS normal logs generated during a previous booting process) or the at least one BIOS error log which are stored in the log memory 53 to generate an error log file, and stores the error log file in the log memory 53. In one embodiment, at least one log that is generated by the BMC 3 and that is related to the BMC sensors 41 is also packaged in the error log file by the BMC 3. For example, when there is a BMC normal log stored in the log memory 53, the BMC 3 packages the BMC normal log along with the plurality of BIOS normal logs or the at least one BIOS error log to generate the error log file.

In this way, error log collection can be realized in the booting process.

Figure 3:
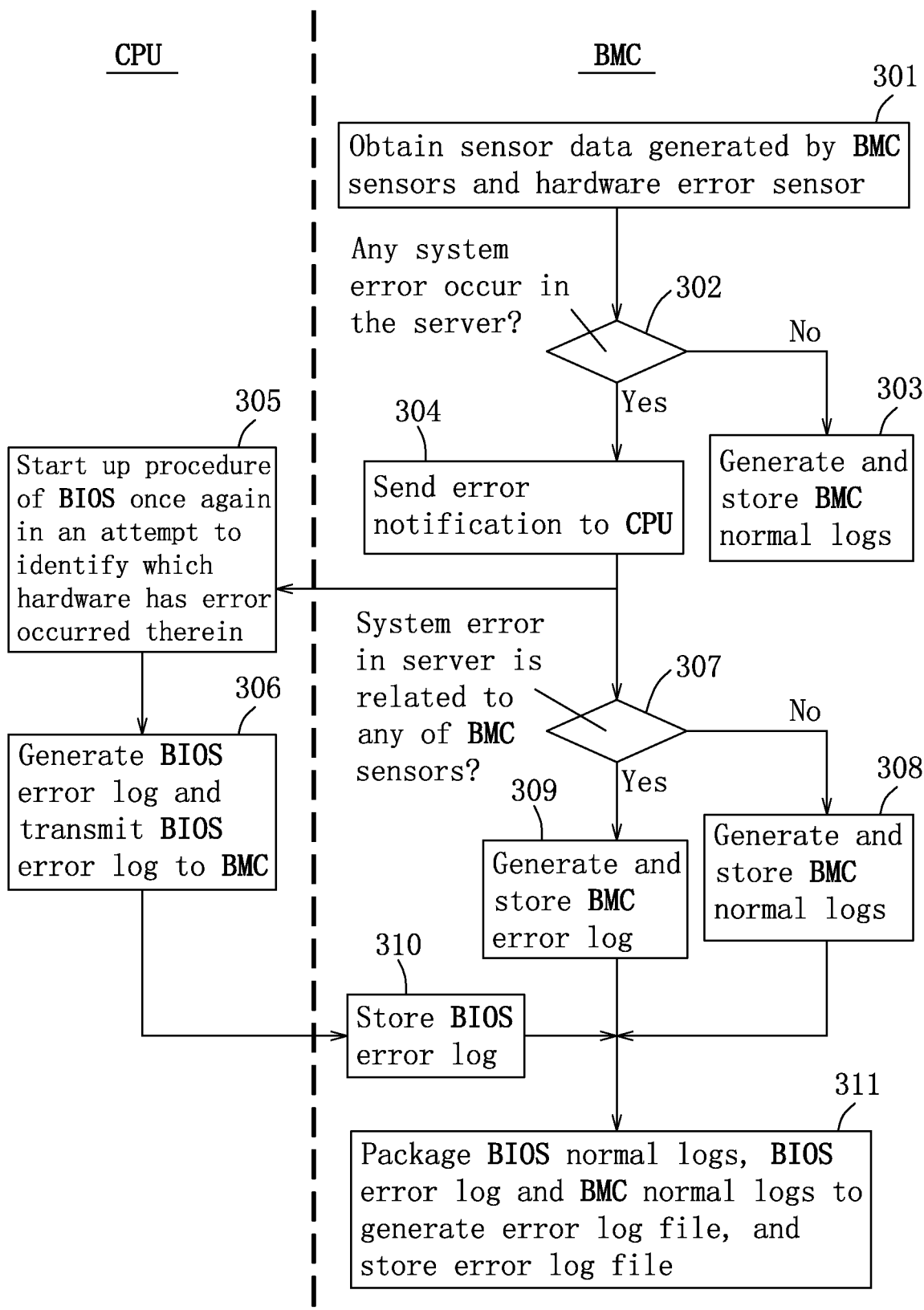
FIG. 3 is a flow chart illustrating an embodiment of the method of collecting error logs according to the disclosure to be implemented by the server in an operating state.

Referring to FIGS. 1 and 3, an embodiment of the method of collecting error logs to be implemented by the server 100 in the operating state is illustrated. The method of collecting error logs includes steps 301 to 311.

In step 301, the BMC 3, by executing the firmware for the BMC 3 stored in the storage module 52, obtains sensor data generated by the BMC sensors 41 and the hardware error sensor 42 by using, for example, polling technique or in response to triggering of event.

In step 302, the BMC 3, by executing the firmware for the BMC 3, determines whether there is any system error in the server 100 based on the sensor data thus obtained. When it is determined that there is no system error in the server 100, a flow of the method of collecting error logs proceeds to step 303. When it is determined that a system error occurred in the server 100, the flow of the method proceeds to step 304.

In step 303, the BMC 3, by executing the firmware for the BMC 3, generates the plurality of BMC normal logs which correspond respectively to the BMC sensors 41 based on the sensor data thus obtained, and stores the plurality of BMC normal logs in the log memory 53. It is noted that when there is insufficient storage space left in the log memory 53 for storing the plurality of BMC normal logs, the BMC 3 is configured to overwrite existing logs (e.g., the BMC normal logs stored the earliest) with the plurality of BMC normal logs generated in this step.

In step 304, the BMC 3, by executing the firmware for the BMC 3, sends an error notification to the CPU 1.

In step 305 following step 304, the CPU 1, in response to receipt of the error notification sent by the BMC 3, starts up the procedure of the BIOS once again in an attempt to identify which hardware has an error. In one embodiment, the system error may include at least one error that may occur in one or more hardware, and the one or more hardware may be one or more of the hardware devices 2 and the CPU 1.

In step 306 which is similar to step 204 shown in FIG. 2, the CPU 1, by executing the firmware for the BIOS, generates the at least one BIOS error log based on detection of an error condition of said one or more of the hardware devices 2 and the CPU 1 having the at least one error, and transmits the at least one BIOS error log to the BMC 3. The at least one BIOS error log has a structured format and corresponds to the one or more of the hardware devices 2 and the CPU 1 having the at least one error.

In step 307 following step 304, the BMC 3 determines whether the system error that occurred in the server 100 is related to any of the BMC sensors 41. When it is determined that the system error is not related to any of the BMC sensors 41, the flow of the method proceeds to step 308. For example, when occurrence of the system error is determined by the BMC 3 based on abnormality found solely in the sensor data generated by the hardware error sensor 42, it can be determined that the system error is not related to any of the BMC sensors 41. When it is determined that the system error is related to one or more of the BMC sensors 41 (e.g., abnormality is found in the sensor data generated by the BMC sensors 41), the flow of the method proceeds to step 309.

In step 308 which is similar to step 303, the BMC 3, by executing the firmware for the BMC 3, generates the plurality of BMC normal logs based on the sensor data thus obtained, and stores the plurality of BMC normal logs in the log memory 53.

In step 309, the BMC 3, by executing the firmware for the BMC 3, generates the at least one BMC error log which corresponds to the one or more of the BMC sensors 41 based on the sensor data thus obtained, and stores the at least one BMC error log in the log memory 53.

In step 310 which follows step 306 and is similar to step 207 shown in FIG. 2, the BMC 3, by executing the firmware for the BMC 3, stores the at least one BIOS error log received from the CPU 1 in the log memory 53.

In step 311 following steps 308, 309 and 310, the BMC 3, by executing packaging instructions contained in the firmware for the BMC 3, packages a plurality of BIOS normal logs (e.g., the plurality of BIOS normal logs previously generated during the booting process), the at least one BIOS error log, and the plurality of BMC normal logs (e.g., the plurality of BMC normal logs generated in step 308 or historical BMC normal logs generated previously) which are stored in the log memory 53 to generate an error log file, and stores the error log file in the log memory 53. It is noted that when it is determined in step 307 that the system error is related to one or more of the BMC sensors 41, the log memory 53 further stores the at least one BMC error log, and the at least one BMC error log is also packaged in the error log file by the BMC 3.

In one embodiment, the plurality of BMC normal logs and the at least one BMC error log may also have a structured format which may be identical to that of the plurality of BIOS normal logs and the at least one BIOS error log. Alternatively, the plurality of BMC normal logs and the at least one BMC error log may have the original format that is not changed since being generated by the BMC 3.

In this way, error log collection can be realized when the server 100 is in the operating state.

To realize error analysis subsequent to error detection, an analyzing device 600 (see FIG. 4) which is configured to electrically connect to the server 100 is used to immediately download the error log file from the server 100 once being notified that the error log file is stored in the log memory 53, so that log data required for error analysis may be acquired in time.

Figure 4:
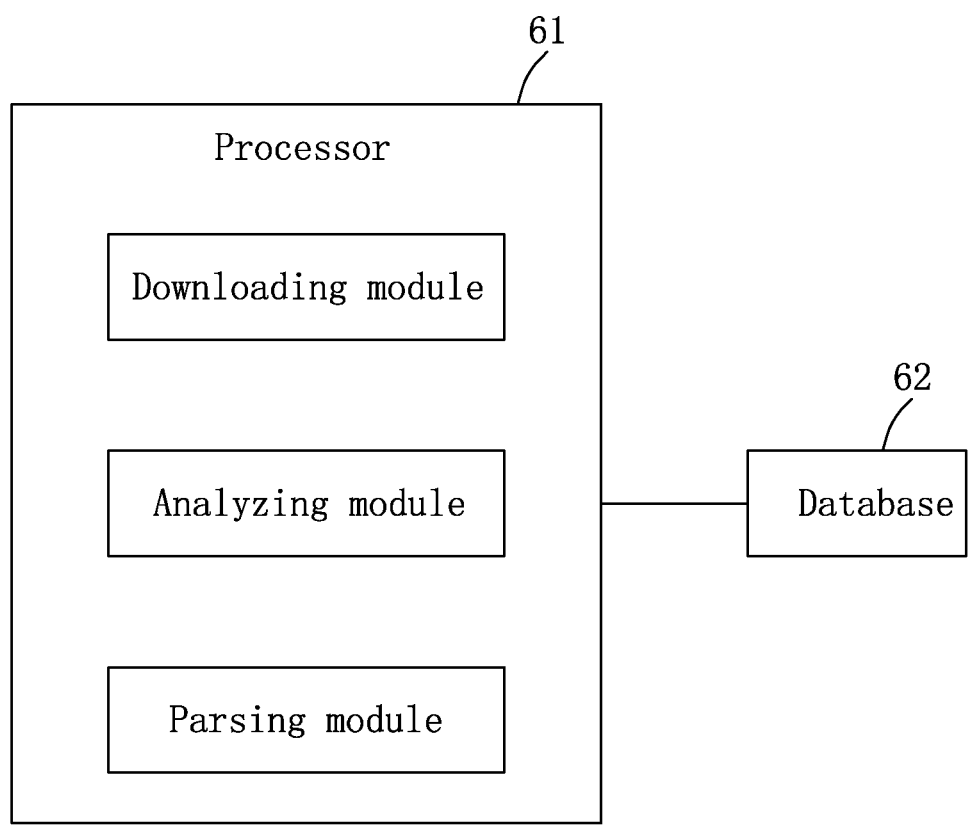
FIG. 4 is a block diagram illustrating an embodiment of an analyzing device adapted to download an error log file from the server.

Referring to FIGS. 1 and 4, an embodiment of the analyzing device 600 includes a processor 61 and a database 62 electrically connected to the processor 61. The processor 61 includes a downloading module, an analyzing module and a parsing module. The processor 61 is configured to download, via the downloading module, the error log file stored in the log memory 53 of the server 100, and stores the error log file thus downloaded in the database 62. The processor 61 is further configured to analyze, via the analyzing module, the error log file stored in the database 62 to obtain an analysis result, and to store the analysis result in the database 62. In one embodiment, the analyzing module includes an error analysis tool which is able to quickly identify and diagnose failed software and/or hardware components based on the error log file. In this way, even though the analyzing capability of the BIOS and the BMC 3 is limited, by introducing the processor 61 which includes the analyzing module, effects of big data analysis and intelligent data analysis may be achieved. Moreover, the processor 61 is further configured to parse, via the parsing module, the error log file stored in the database 62 to obtain a parsed result, and to output the parsed result. In one embodiment, the parsing module is implemented as a parser program, and the parsed result is in the HyperText Markup Language (HTML) format and is displayed on a display screen to allow an administrator of the analyzing device 600 to inspect error logs recorded in the error log file with ease. In one embodiment, the parsed result contains a summary of the error logs recorded in the error log file, and/or a table listing all the error logs. It is noted that the downloading module, the analyzing module and the parsing module may be implemented as hardware circuits and/or modular blocks for software which are executable to carry out corresponding functions mentioned in this disclosure. In some embodiments, the downloading module, the analyzing module and the parsing module may be realized by physical computer(s) and/or virtual machine(s) to provide software as a service (SaaS) applications for clients.

In one embodiment, referring to FIG. 1, the server 100 is further configured to parse, via a parser program stored in the storage module 51 or other storage medium (e.g., a hard disk drive), the error log file stored in the log memory 53 to obtain a parsed result. In other words, the server 100 itself has the parsing capability, and is also able to send the parsed result to a client terminal (not shown) to allow the client terminal to show the parsed result. For example, FIG. 5 illustrates an exemplary embodiment 700 of the parsed result that includes an error type indicating which component (e.g., the computer memory) has an error, and an error condition describing what kind of error is found in the component (e.g., an uncorrectable memory error was detected in DIMM slot 1), allowing a user to have a preliminary understanding of the issues with the server 100.

Figure 6:
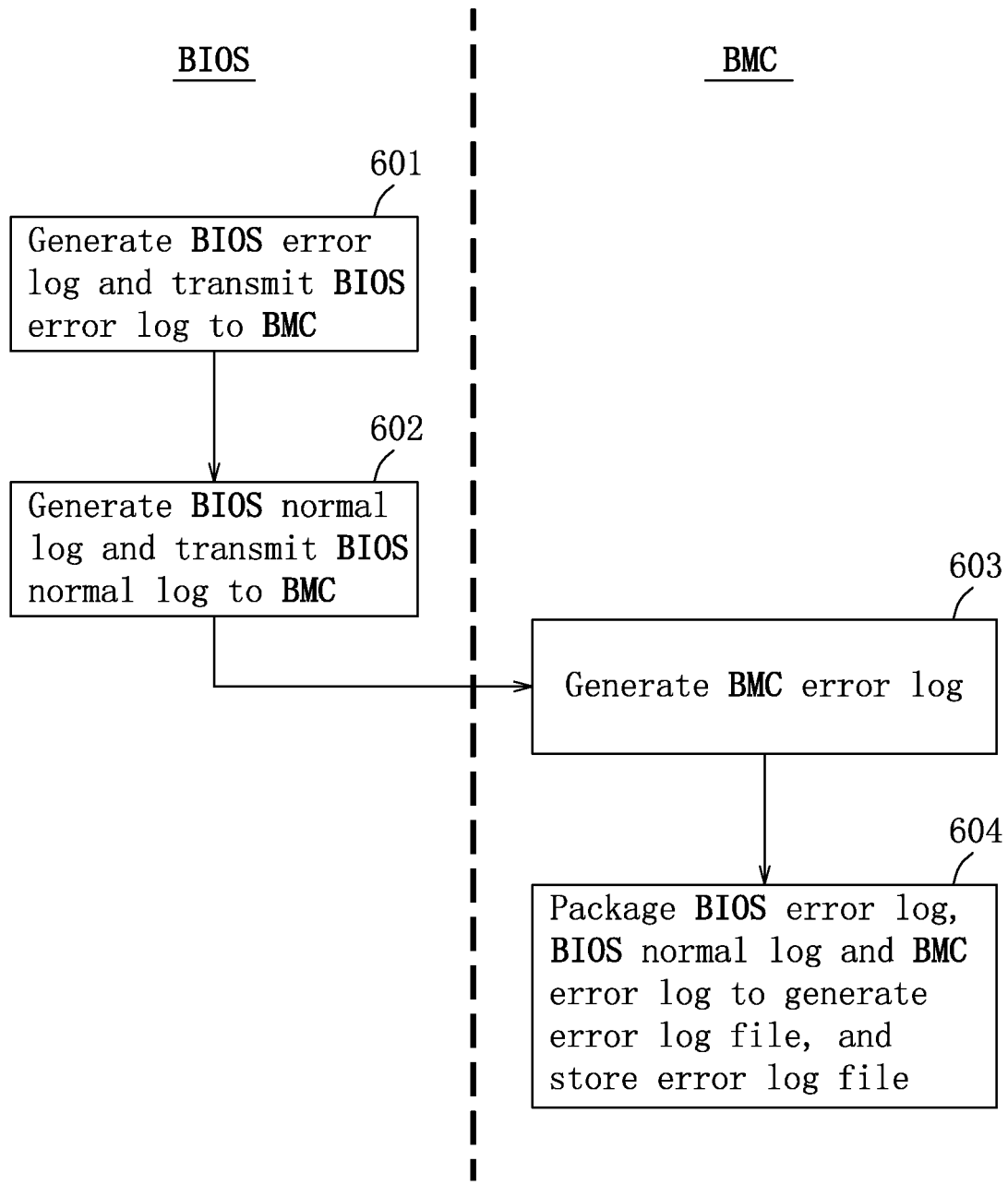
FIG. 6 is a flow chart illustrating an embodiment of the method of collecting error logs according to the disclosure.

Referring to FIGS. 1 and 6, an embodiment of the method of collecting error logs according to the disclosure is illustrated. The method includes steps 601 to 604.

In step 601, the BIOS of the server 100 generates at least one BIOS error log based on detection of an error condition of one or more of the hardware devices 2 having at least one error, and transmits the at least one BIOS error log to the BMC 3. The at least one BIOS error log corresponds to the one or more of the hardware devices 2 having the at least one error.

In step 602, the BIOS generates at least one BIOS normal log based on detection of normal operation of one or more of the hardware devices 2, and transmits the at least one BIOS normal log to the BMC 3. The at least one BIOS normal log corresponds to the one or more of the hardware devices (2) in normal operation.

In step 603, the BMC 3 generates at least one BMC error log that corresponds to one or more of the BMC sensors 41 to which a system error is related.

In step 604, the BMC 3 packages the at least one BIOS error log, the at least one BIOS normal log, and the at least one BMC error log to generate an error log file, and stores the error log file in the log memory 53.

To sum up, the method of collecting error logs at least has the following advantages.

1. When it is determined that there is at least one error in one or more of the hardware devices 2 and the CPU 1 or when it is determined that a system error occurred in the server 100, the CPU 1 during the procedure of the BIOS is able to generate at least one BIOS error log based on detection of an error condition of said one or more of the hardware devices 2 and the CPU 1. Since the at least one BIOS error is generated immediately upon detection of an error and has a structured format, the error log file generated by the BMC 3 through packaging the at least one BIOS error log and other logs is able to truthfully reflect an operating condition of hardware with the error, facilitating the rebuilding of the hardware environment where the error had occurred.

2. Since the plurality of BIOS normal logs and the at least one BIOS error log all have structured formats, and since not only the at least one BIOS error log and the at least one BMC error log but also the plurality of BIOS normal logs and the plurality of BMC normal logs are packaged in the error log file, error analysis subsequent to error detection may be performed with ease.

3. Each time occurrence of an error is detected, the BMC 3 stores the error log file corresponding to that error in the log memory 53. Moreover, the analyzing device 600, after connecting to the server 100 via a network, is able to acquire the error log file in time from the server 100 through downloading the same. As a result, convenience in obtaining error logs is promoted and cost incurred for error detection may be decreased.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method of collecting error logs, the method to be implemented by a server that includes a central processing unit (CPU), a plurality of hardware devices, a baseboard management controller (BMC), and a plurality of BMC sensors, the method comprising:
   when it is determined that there is no system error in the server or when it is determined that a system error occurred in the server but the system error is not related to any of the BMC sensors, by the BMC, generating a plurality of BMC normal logs which correspond respectively to the BMC sensors and storing the plurality of BMC normal logs;
   by the BMC when it is determined that a system error occurred in the server, sending an error notification to the CPU;
   when it is determined that a system error occurred in the server and the system error is related to one or more of the BMC sensors, by the BMC, generating at least one BMC error log which corresponds to the one or more of the BMC sensors and storing the at least one BMC error log;
   by the CPU when it is determined, during procedure of Basic Input/Output System (BIOS) of the server, that at least one error occurred in one or more of the hardware devices and the CPU, generating at least one BIOS error log based on detection of an error condition of said one or more of the hardware devices and the CPU, where the procedure of BIOS is performed by the CPU during a booting process of the server or in response to receipt of the error notification sent by the BMC when the server is in an operating state, and the at least one BIOS error log has a structured format and corresponds to the one or more of the hardware devices and the CPU;
   by the CPU, transmitting the at least one BIOS error log to the BMC;
   by the BMC, storing the at least one BIOS error log received from the CPU; and
   by the BMC, packaging the at least one BIOS error log and at least one log that is generated by the BMC and that is related to the BMC sensors to generate an error log file, and storing the error log file;
   wherein when it was determined that a system error occurred in the server but the system error was not related to any of the BMC sensors, the packaging the at least one BIOS error log and at least one log related to the BMC sensors is to package the at least one BIOS error log and the plurality of BMC normal logs thus stored to generate the error log file; and
   when it was determined that a system error occurred in the server and the system error was related to one or more of the BMC sensors, the packaging the at least one BIOS error log and at least one log related to the BMC sensors is to package the at least one BIOS error log, the plurality of BMC normal logs previously generated, and the at least one BMC error log thus stored to generate the error log file.

2. The method as claimed in claim 1, further comprising:
   by the CPU after the procedure of the BIOS has completed successfully, generating a plurality of BIOS normal logs based on detection of normal operation of the hardware devices and the CPU, where the plurality of BIOS normal logs have a structured format and correspond respectively to the hardware devices and the CPU;
   by the CPU, transmitting the plurality of BIOS normal logs to the BMC; and
   by the BMC, storing the plurality of BIOS normal logs received from the CPU.

3. The method as claimed in claim 2, wherein the packaging the at least one BIOS error log and at least one log related to the BMC sensors is to package the at least one log that is generated by the BMC and that is related to the BMC sensors along with the plurality of BIOS normal logs and the at least one BIOS error log to generate the error log file.

4. The method as claimed in claim 1, wherein the at least one BIOS error log indicates the structured format of the at least one BIOS error log, a type of error, and information related to the error condition.

5. The method as claimed in claim 4, wherein the structured format is implemented to be one of comma-separated values (CSV) file format, JavaScript Object Notation (JSON) file format, and Extensible Markup Language (XML) file format.

* * * * *